United States Patent [19]
Shinjo

[11] 3,948,141
[45] Apr. 6, 1976

[54] LOAD INDICATING WASHER

[76] Inventor: Katsumi Shinjo, 8, 6-chome, Asahiminamidoori, Nishinariku, Osaka, Japan

[22] Filed: Aug. 20, 1974

[21] Appl. No.: 499,088

[52] U.S. Cl. ............... 85/62; 73/88 F; 116/DIG. 34
[51] Int. Cl.² .......................................... F16B 31/02
[58] Field of Search. 116/114 AB, 114 AJ, 114 AH, 116/DIG. 34, DIG. 41; 73/88 F; 85/62, 50; 151/38

[56] References Cited
UNITED STATES PATENTS

| | | | |
|---|---|---|---|
| 2,572,940 | 10/1951 | Lockhart | 116/114 AB X |
| 2,724,964 | 11/1955 | Singdale | 73/88 X |
| 2,824,481 | 2/1958 | Johnson | 116/DIG. 34 |
| 3,137,268 | 6/1964 | Hornwood | 116/114 R |
| 3,285,120 | 11/1966 | Kartiala | 85/62 |
| 3,304,827 | 2/1967 | Bush | 85/62 |
| 3,383,974 | 5/1968 | Dahl | 85/62 |
| 3,495,907 | 2/1970 | Rogers | 85/62 X |
| 3,631,910 | 1/1972 | Crowther | 151/38 |

*Primary Examiner*—Richard C. Queisser
*Assistant Examiner*—Daniel M. Yasich
*Attorney, Agent, or Firm*—Craig & Antonelli

[57] ABSTRACT

A load-indicating washer for use in joining two different elements which is capable of visually indicating the tightening force applied against a locking bolt and nut through the indication of encapsulated fluid released under the tightening load. The encapsulated fluid being provided in a depression formed in at least one bearing surface of the washer.

13 Claims, 11 Drawing Figures

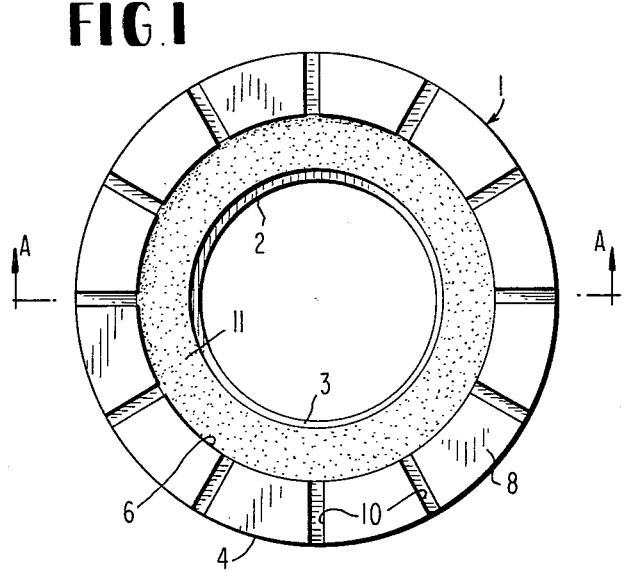
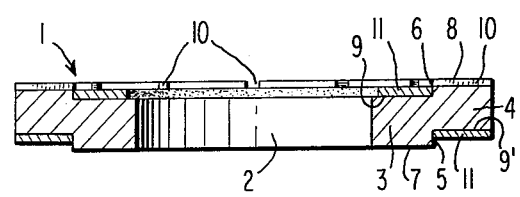
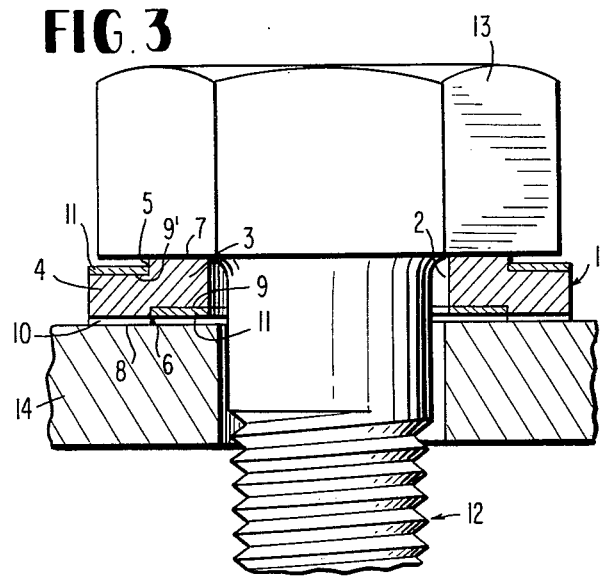
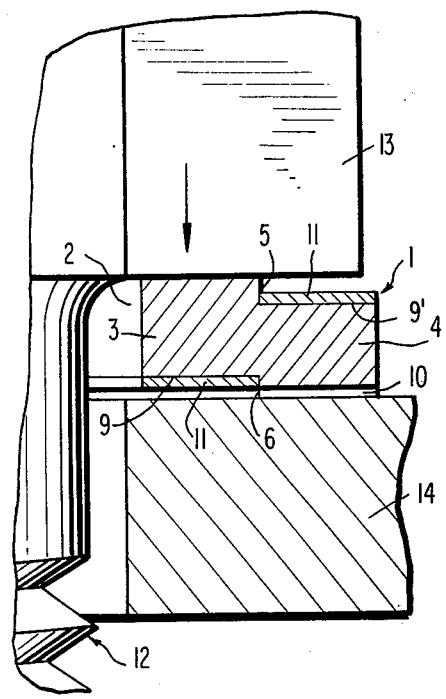
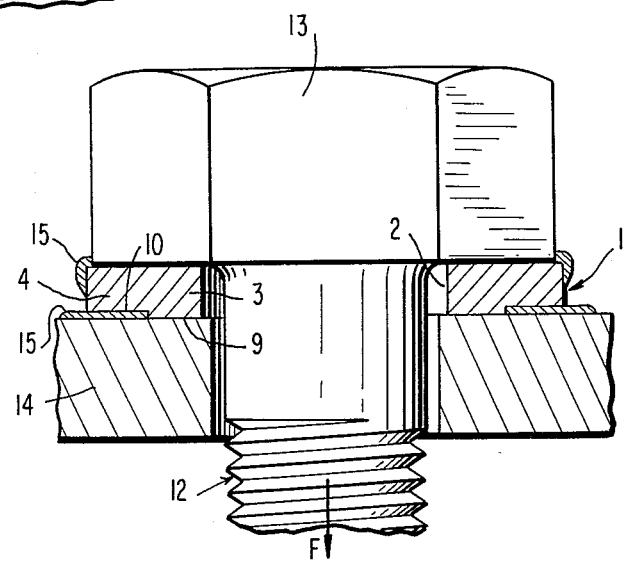

LOAD INDICATING WASHER

The present invention relates to a washer arrangement and more particularly to a load-indicating washer arrangement for use in joining two different elements by means of a bolt and a nut. Specifically, the arrangement relates to a load-indicating washer capable of providing a visual indication of the load applied against the bolt.

It is known in the art that two different elements, such as elements of a machine or other structure, are joined to each other by means of a bolt and a nut; however, it is of major concern to insure a better joint with optimum fastening strength. For example, if the fastening force is not sufficiently strong the bolt and the nut will become loose in the course of operation of the machine or other structure; however, if the fastening force is too strong, the bolt and nut are subject to a detrimental axial load exceeding their yield-point, thereby resulting in the breakage or rounding of the threads thereof, or the deformation or breakage of the pieces being joined. Accordingly, it is essential to control the tightening strength of the bolt and nut to a reasonable extent.

In the prior art it is the common practice to use a torque-wrench for tightening a nut or bolt with appropriately controlled torque thereby applying an optimum strength of axial tightening force to the shank of the bolt. However, this method is disadvantageous in that, in deciding the value of a tightening force or torque, no consideration is given to a possible frictional resistance between the joining pieces and to the unavoidable dimensional variation of the threads on the part of the bolts and nuts employed for fastening the elements. Consequently, the applied tightening force will be offset by these negative factors thereby resulting in an inadequate joint of the elements being joined.

The aim underlying the present invention essentially resides in solving the disadvantages encountered by the torque-wrench method and has for its object the provision of a load-indicating washer capable of visually controlling a tightening force against a bolt and nut without the use of any special devices and tools. According to one embodiment of the present invention, a load-indicating washer is provided having an uneven bearing surface in which is provided a depression. A fluid capsule is coated within the depression whereby, when the washer is compressed and generally flattened under a load applied against a fastening bolt, the fluid capsule layer in the depression is broken to release the confined fluid outside. Through the flow of the fluid, an operator can recognize that the applied force has reached its desired value to join the elements.

In a further embodiment of the present invention, a depression is provided on each of the bearing surfaces of the washer in which depression a fluid capsule is coated.

In yet another embodiment of the present invention the depression provided in the bearing surface of the washer is surrounded by a conical side wall.

According to one feature of the present invention each washer has a previously measured critical value of force at which it is flattened to the extent that the fluid capsule is broken thereby providing an indication that the critical value has been reached.

These and other objects, features, and advantages of the present invention will become more obvious from the following description when taken in connection with the accompanying drawing which shows, for the purposes of illustration only, several embodiments of a washer arrangement in accordance with the present invention, and wherein:

FIG. 1 is a bottom view of a washer in accordance with the present invention;

FIG. 2 is a cross-sectional view of the washer of FIG. 1 taken along the line A—A;

FIG. 3 is a cross-sectional view of the washer placed between a bolt head and an element to be joined prior to a load application thereon:

FIG. 4 is a partial cross-sectional of the washer of FIG. 3 with a load being applied thereto;

FIG. 5 is a cross sectional view of the washer of FIG. 4 when a desired strength of tightening force has been applied thereto;

Figure 6:
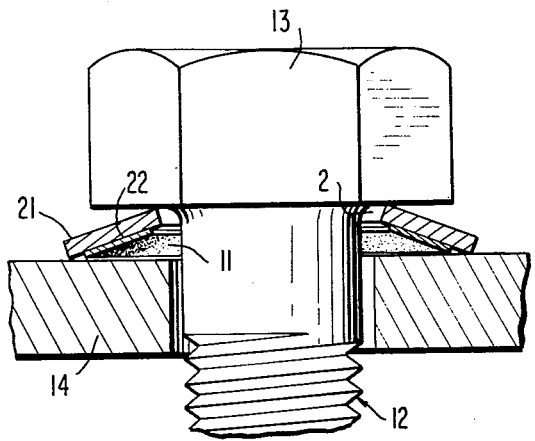
FIG. 6 is a cross-sectional view of a further embodiment of the present invention prior to the application of a load thereon.

Referring now to the drawings wherein like reference numerals are used throughout the various views to designate like parts and more particularly to FIGS. 1 through 5, wherein a washer generally designated by the reference numeral 1 is provided with a stepped portion or inner depression 9 in one of the bearings surfaces and an outer depression or stepped portion 9' in the opposite bearing surface. The inner and outer depressions 9, 9' are ring-shaped and are concentrically disposed with respect to the central circular hole or aperture 2 of the washer in which a bolt generally designated by the reference numeral 12 is received.

A wall 6 is interposed between the inner ring-shaped depression and the outside rim of the washer 1 and a flat portion 8 is defined between the wall 6 and the outside rim of the washer 1. The flat portion 8 is provided with a plurality of radially extending grooves 10 communicating with the inner depression 9.

A wall 5 is interposed between the outer ring-shaped depression 9' and the inside rim of the washer 1 and a flat portion 7 is defined between the inside rim of the washer 1 and the wall 5.

Each depression 9, 9' has a base portion 3, 4, respectively, which is coated with an encapsulated fluid layer 11. While in actual practice the encapsulated fluid layer is extremely small, in the drawings the layer 11 is magnified for the sake of clarity. The fluid layer 11 may consist of any appropriate fluid which would be visible such as a dye, ink or the like with the color of such fluid being selected to provide the greatest visible indication in any given set of circumstances. Preferably, a bright colored fluid such as red or yellow is recommended for its eye-catching nature.

As shown in FIG. 3, the washer 1 is used in a conventional manner by being placed between a bolt head 13 and a piece for element 14 to be joined. When the washer is placed on the element 14 under the bolt head, the flat portion 8 of its bearing surface is initially kept in engagement with the piece 14 while the encapsulated fluid layer 11 in the inner depression 9 is maintained out of engagement therewith. Similarly, the flat portion 7 of the opposite bearing surface is placed in engagement with the bolt head 13 while the encapsulated fluid layer 11 in the outer depression 9' is maintained away from the bolt head 13.

As the bolt is tightened, as shown in FIG. 4, an axial force in the direction of the arrow F is applied against the washer 1. In the course of tightening the bolt 13, the walls 5 and 6 of the washer 1 are exposed to a shearing strain along the line S and the base portion 3 of the flat portion 7 is deformed under a downward depression.

With the continued exertion of force, the base portion 3 is displaced downwards such that the bottom of the depression 9 is raised up to the same level as the flat portion 8 thereby crushing the encapsulated fluid 11 between the lower base portion 3 and the element 14. As a result of this crushing of the layer 11, fluid is released to flow, as indicated by the reference numeral 15, through the radially arranged grooves 10. Simultaneously, the encapsulated fluid layer 11 in the outer depression 9' is crushed thereby enabling the fluid to flow outside through the gap between the bolt head 13 and the washer 1. When this condition obtains, an indication is given that the locking force has reached the desired value at which the bolt 12 is appropriately tightened, for example, the pieces or elements are joined with the optimum strength of force. In this manner an applied load can be inspected by sight and the bolt tension can be confirmed.

The washer 1 of the present invention may be fitted on the bolt with either the inner depression or the outer depression facing outward. For example, in FIGS. 3 – 5, the washer 1 is placed such that the outer depression 9' is facing the bolt head 13; however, the washer 1 can be inverted and disposed as shown in FIGS. 1 and 2.

Figure 7:
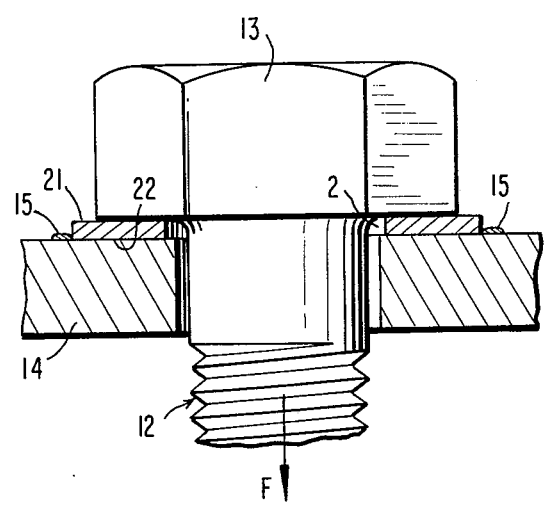
FIG. 7 is a cross-sectional view of the embodiment of FIG. 6 with the desired strength of tightening force applied thereto.
Figure 8:
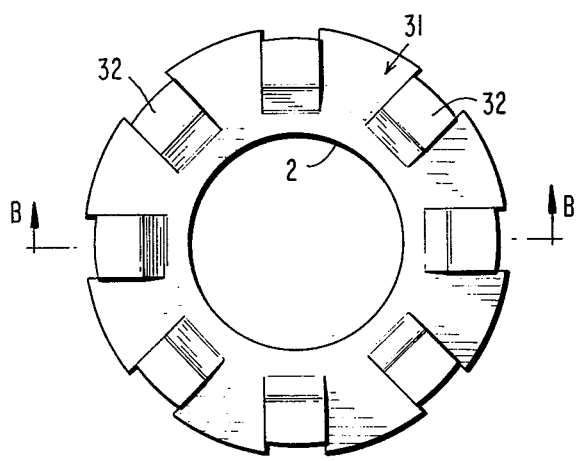
FIG. 8 is a plan view of a further embodiment of the present invention.

In FIGS. 6 and 7, a washer 21 is provided having a substantially conical form with the encapsulated layer 11 being provided on the inside surface of side wall 22 of the washer 21. When this washer 21 is stressed by the bolt head 13 against the piece 14, the side wall 22 is completely flattened as shown in FIG. 7, thereby enabling the fluid to spread out on the piece or element 14 as shown by the reference numeral 15. The spreading out of the fluid, as with the previously discussed embodiments, indicates that the applied force has reached its desired value and also provides a warning that no further force should be applied.

Figure 9:
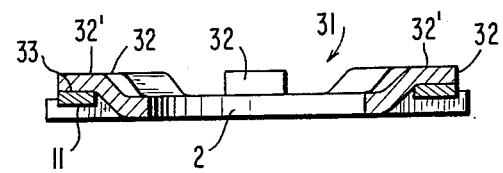
FIG. 9 is a cross-sectional view of the embodiment of FIG. 8 taken along the line B—B.
Figure 10:
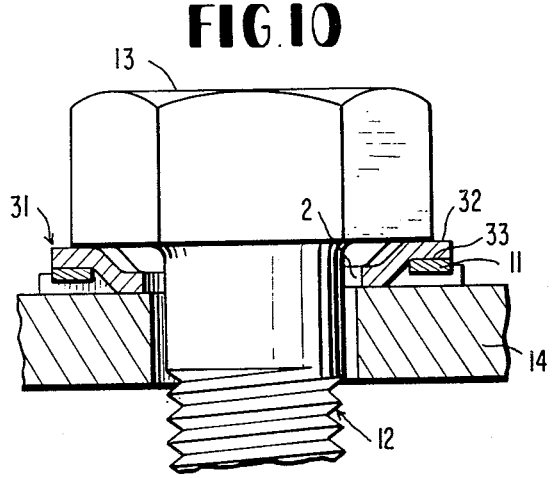
FIG. 10 is a transverse cross-sectional view of the embodiment of FIG. 8 disposed between a bolt head and a piece to be joined.
Figure 11:
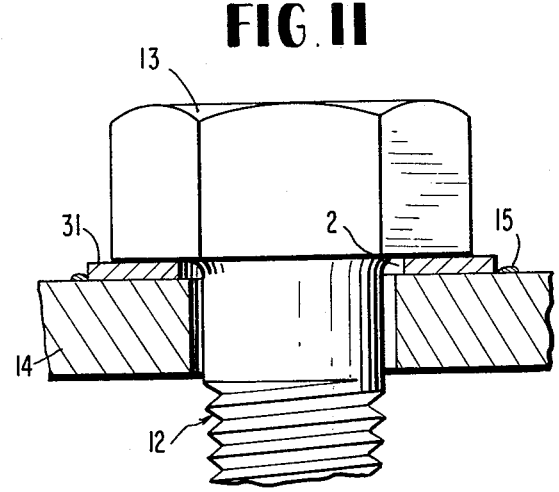
FIG. 11 is a cross-sectional view of the embodiment of FIG. 10 when a tightening load is applied thereto.

In the embodiment illustrated in FIGS. 8 through 11, a washer 31 is provided with slotted tabs 32 disposed in the rim thereof. As shown in FIG. 9, the tabs 32 are doubly bent so as to have a horizontally extending flat portion 32'. An encapsulated fluid layer 11 is coated on the back 33 of each horizontal portion 32'. The washer is placed on the element 14 such that the encapsulated layer 11 faces the element 14. While the bolt is tightened, the tabs 32 are flattened thereby crushing the encapsulated layer 11 under the applying load. Therefore, the fluid flows through the gap between the washer and the element 14 as indicated by the reference numeral 15 whereby it is confirmed that the applied load against the bolt has reached its desired value. Thus, the strength of the locking force to be applied to the washer 31 is controlled by selecting variants of the washers having different numbers and sizes of slotted tabs 32.

As described in the foregoing, the washer is provided with depressions preferably in the bearing surface thereof to face the elements being joined in which depressions the fluid capsule layers 11 are formed. In the course of tightening the bolt, the uneven washer is readily flattened under the applying load against the bolt whereby the fluid layer is broken to release the confined fluid through gaps between the bolt head, the washer and the pieces being joined. Through the indication of the fluid, an operator can readily recognize that the applied load is appropriate for joining the pieces without the need of any special tools or devices. By appropriately selecting the size and depth of the depression in the washer, a variety of strength of load can readily be achieved. Additionally, the production of load-indicating washer according to the present invention is possible at a relatively low cost and the visual inspection insures a better joining of the pieces against any fracture accidents due to an overload of the fastening.

While I have shown and described the several embodiments of the present invention, it is understood that the same is not limited thereto but is susceptible of numerous changes and modifications as known to a person skilled in the art, and I therefore do not wish to be limited to the details shown and described herein but intent to cover all such changes and modifications as are encompassed by the scope of the appended claims.

What is claimed is:

1. A load-indicating washer having a central hole and a rim portion, the load indicating washer comprising: two bearing surface means provided in the rim portion, said two bearing surface means consisting of an upper bearing surface means and a lower bearing surface means, a depression provided in each of said bearing surface means, each of said depressions being substantially ring-shaped and disposed substantially concentrically with the central hole, one of said ring-shaped depressions being disposed adjacent the central hole and the other ring-shaped depression being disposed along the periphery of the washer, means for communicating said depression disposed adjacent the central hole with the outside washer, and means selectively retained in each depression for visually indicating the load applied on the washer including at least one layer of an indicating fluid, each of said bearing surface means includes a substantially flat portion, each of said bearing surface means includes a substantially flat portion, each of said depressions being connected to said flat portion by a wall extending substantially parellel to the axis of the central hole, and wherein said means for communicating said depression disposed adjacent the central hole includes a plurality of radially extending grooves provided in said substantially flat portion of said bearing surface means.

2. A washer according to claim 1, wherein said ring-shaped depression disposed adjacent the central hole is provided in said lower bearing surface means, and said ring-shaped depression disposed along the periphery of the washer is provided in said upper bearing surface means.

3. A washer according to claim 1, wherein said ring-shaped depression disposed adjacent the central hole is provided in said upper bearing surface means, and said ring-shaped depression disposed along the periphery of the washer is provided in said lower bearing surface means.

4. A washer according to claim 1, wherein the wall in said upper bearing surface means and the wall in said lower bearing surface means are in substantial alignment.

5. A washer according to claim 1, wherein a plurality of depressions are provided in at least one said bearing surface means, at least one layer of an indicating fluid is disposed in each of said plurality of depressions.

6. A washer according to claim 1, wherein said layer is an encapsulated layer of indicating fluid.

7. A washer according to claim 6, wherein the indicating fluid consists of an encapsulated layer of ink.

8. A washer according to claim 6, wherein the indicating fluid consists of an encapsulated layer of a dye solution.

9. A load-indicating washer having a central hole, a rim portion concentric with said central hole, the load indicating washer comprising: bearing surface means provided on opposite surfaces of said rim portion, said bearing surface means includes a plurality of radially extending tab means bent out of the plane of the washer, said radially extending tab means defining a plurality of spaced depressions in one of the surfaces of said rim portion, and at least one layer of encapsulated indicating fluid disposed in each of said plurality of depressions.

10. A washer according to claim 9, wherein said layer is an encapsulated layer of indicating fluid.

11. A washer according to claim 10, wherein the indicating fluid consists of an encapsulated layer of ink.

12. A washer according to claim 10, wherein the indicating fluid consists of an encapsulated layer of a dye solution.

13. A washer according to claim 9, wherein each of said radially extending tab means includes a first surface portion extending out of the plane of the washer, a second substantially flat surface portion connected with said first surface portion, said substantially flat surface portion constituting one of said bearing surface means.

* * * * *